United States Patent [19]

Jackson

[11] 4,024,154

[45] May 17, 1977

[54] MANUFACTURE OF COPPER PHTHALOCYANINE PIGMENT VIA AQUEOUS MILLING

[75] Inventor: Julius Jackson, Westfield, N.J.

[73] Assignee: E. I. Du Pont de Nemours and Company, Wilmington, Del.

[22] Filed: Apr. 7, 1976

[21] Appl. No.: 674,669

[52] U.S. Cl. ............................................. 260/314.5
[51] Int. Cl.² ......................................... C09B 47/04
[58] Field of Search ................................. 260/314.5

[56] References Cited

UNITED STATES PATENTS

| | | | |
|---|---|---|---|
| 2,857,400 | 10/1958 | Cooper | 260/314.5 X |
| 3,017,414 | 1/1962 | Minnich et al. | 260/279 |
| 3,758,321 | 9/1973 | Santimauro et al. | 260/288 Q |
| 3,801,591 | 4/1974 | Jackson | 260/314.5 |

*Primary Examiner*—John D. Randolph

[57] ABSTRACT

Improved process for converting copper phthalocyanine to pigmentary form by dry milling the copper phthalocyanine, contacting the dry-milled copper phthalocyanine with an organic liquid in water emulsion, and recovering the pigmentary copper phthalocyanine. The improvement resides in the use of at least one aliphatic hydrocarbon derived from petroleum as the organic liquid. The pigmentary copper phthalocyanine which results from the improved process exhibits superior tinctorial properties and is especially useful in coating compositions requiring high quality pigment.

7 Claims, No Drawings

MANUFACTURE OF COPPER PHTHALOCYANINE PIGMENT VIA AQUEOUS MILLING

BACKGROUND OF THE INVENTION

This invention relates to a process for converting copper phthalocyanine to pigmentary form, and particularly to an improved process which produces pigmentary copper phthalocyanine characterized by superior tinctorial properties.

Copper phthalocyanines are well known in the art as pigments in a wide variety of applications. Like many other compounds useful as pigments, copper phthalocyanines obtained directly from most conventional syntheses cannot be directly used in pigmentary application because of particle size, crystal habit, texture or other factors which contribute to inadequate tinctorial properties.

Many processes are known in the art for converting crude copper phthalocyanine to pigmentary form. The well known acid pasting procedure whereby the unconditioned or crude copper phthalocyanine is dissolved wholly or partly in concentrated sulfuric acid and the solution drowned in water or an aqueous solution provides a relatively simple means for reduction of the particle size of the crude copper phthalocyanine. However, the use of concentrated mineral acid represents a hazard to personnel, equipment and entails the use of large volumes of reagents and costly equipment. Furthermore, pollution problems can arise in disposing of large volumes of the acid wastes from such processes.

Another technique, known in the art as "solvent milling", involves the grinding of crude phthalocyanines in the presence of certain volatile organic liquids. This general procedure is subject to the disadvantages that the use of rather substantial quantities of relatively expensive organic solvents involves inherent fire and explosion hazards, solvent recovery costs, solvent losses and water pollution problems.

Still another technique, especially applicable to highly chlorinated copper phthalocyanines, involves heating the copper phthalocyanine in an aqueous medium at or above 90° C., preferably between 100° and 300° C., while, advantageously, agitating the mixture. This procedure results in soft, readily dispersible chlorinated copper phthalocyanine, and is effective as a means of breaking up agglomerates of crude chlorinated copper phthalocyanines which are obtained in a finely divided form but which on drying undergo increments in grain size and harden. Such a procedure is ineffective when applied to crude copper phthalocyanines, the particle size of which is relatively large. Even in the case where dry-milled copper phthalocyanine is employed, the tinctorial properties of the resulting pigmentary copper phthalocyanine are not adequate for many high quality pigmentary applications.

In an attempt to overcome the disadvantages of the procedures described above, procedures known as "aqueous milling" were developed. One aqueous milling procedure described in Santimauro et al. U.S. Pat. No. 3,758,321 involves grinding crude unconditioned phthalocyanine compound suspended in a liquid grinding medium comprising water and a liquid water-immiscible volatile organic solvent. The water is present in an amount which is at least 60% by weight of the grinding medium and the organic solvent is in an amount from 15 to 30 parts by weight for each part by weight of the crude phthalocyanine compound. Another aqueous milling procedure described in Minnich et al. U.S. Pat. No. 3,017,414 involves dry milling crude phthalocyanine pigment, contacting the dry-milled phthalocyanine with an organic liquid in water emulsion, and recovering the pigmentary copper phthalocyanine, e.g., via steam distillation. The organic liquid used is selected from nitrobenzene, benzonitrile, unsubstituted aromatic hydrocarbons, chlorinated aromatic hydrocarbons, and chlorinated aliphatic hydrocarbons, boiling between about 100° and 250° C.

Although the aqueous milling procedures described above eliminate many of the disadvantages inherent to other art processes, the tinctorial quality of the copper phthalocyanine pigment so produced, though adequate for many applications, is insufficient for particularly high quality pigmentary applications.

This invention provides for an improved aqueous milling process which, like prior aqueous milling processes, eliminates many of the disadvantages of other art processes and, unlike prior aqueous milling processes, produces a pigmentary copper phthalocyanine having superior tinctorial properties.

SUMMARY OF THE INVENTION

According to the invention there is provided an improvement in a process for converting crude copper phthalocyanine to pigmentary form which comprises dry milling copper phthalocyanine in a milling apparatus having an attrition and shearing action, contacting the dry-milled copper phthalocyanine with an organic liquid in water emulsion, and recovering the pigmentary copper phthalocyanine. The improvement resides in utilizing as the organic liquid at least one aliphatic hydrocarbon derived from petroleum boiling from 50° to 180° C. The organic liquid is preferably selected from the group consisting of heptane and aliphatic hydrocarbons boiling from 96° to 146° C., such as VMP Naphtha and Varsol.

The weight ratio of water to copper phthalocyanine is preferably from 5 to 10 and more preferably from 6 to 8.33. The weight ratio of organic liquid to copper phthalocyanine is preferably from 0.10 to 0.30 and more preferably from 0.17 to 0.24. The emulsion should preferably contain a surfactant and the weight ratio of surfactant to copper phthalocyanine is preferably from 0.03 to 0.10.

DETAILED DESCRIPTION OF THE INVENTION

The process of this invention is applicable to the conversion to pigmentary form of various crude copper phthalocyanines, including unsubstituted copper phthalocyanine, particularly chlorine-free copper phthalocyanine of the beta phase, and chlorine-containing copper phthalocyanine of the alpha phase. It is well known in the art that unsubstituted copper phthalocyanine is capable of existing in two crystal phases: a red shade product, herein called the alpha phase in accordance with F.I.A.T. Report 1313 (PB-85172), vol. III; and the much greener product, herein called the beta phase in accordance with U.S. Pat. No. 2,556,726. It is also known that the method of particle size reduction often influences the crystal phase of such pigments. For example, it is known that, in the presence of crystallizing solvents, chlorine-free copper phthalocyanine tends to be converted to the beta crystal phase. Thus, the application of this invention to the chlorine-free crude copper phthalocyanine results in beta phase copper phthalocyanine. On the other hand, chlorine-containing crude copper phthalocyanines generally exist only in one phase, the alpha phase, and this is not affected by the application of this invention.

Dry-milling, as used in this invention, means milling in the complete absence of liquids or, if liquids are used, such as a phase-directing solvent or a surface-active agent, they are present in such small amounts that the pigment retains the characteristics of a dry powder.

The conditions applicable to the dry-milling operation which is the first step in this process are not especially critical and are substantially as described in Minnich et al. U.S. Pat. No. 3,017,414. The mill loading is substantially conventional for ball milling operations. Thus, it is conventional for the charge of grinding media to occupy about half of the volume of the mill and for the material being ground to occupy considerably more than the voids between these media so that the total charge in the mill is in the range of 60–65% of the total volume of the mill. It is quite possible to increase the charge to the range of about 75% of the volume of the mill with some increase in the milling time. The choice of these conditions is well within the skill of one versed in this type of operation. The preferred grinding media in the mills are the rod type, but these may vary in size, and it is quite possible to use ordinary round steel balls varying from ⅛ inch in diameter up to ½ inch in diameter or more in the operation. When round balls are used there is a marked tendency for the charge to cake in the mill under some conditions, and this is often avoided by the addition of materials of an irregular shape, such as nails, to the charge. The use of the rod type usually obviates this caking.

It is impossible to set up limits as to the length of the dry-milling cycle since it will vary depending upon the pigment being treated, the mill loading, and the type of mill being used. In order to establish the optimum length of time for dry milling a particular pigment under a given set of conditions, it is recommended that the invention be run with variations in the dry-milling time and that rubouts of the finished product be compared with standard rubout samples exhibiting the desired degree of pigment quality. A minimum of 4–6 hours is usually required, and this may be extended to as much as 12–18 hours or even more. It is characteristic of this operation and one of the unexpected features that the dry powder obtained following the milling step shows no significant improvement with respect to ordinary pigment properties over the original crude pigment. It is only when the subsequent treatments with emulsions of organic liquids are applied to this powder that its improved properties become apparent.

The preferred method of dry milling is ball milling. However, any milling or grinding method which utilizes an attrition and shearing action may be used. Such attrition and shearing action may be accomplished in rod mills, stirred and vibratory types of ball mills, and the like.

The organic liquids useful in the process of the invention are water-immiscible aliphatic hydrocarbons derived from petroleum boiling from 50° to 180° C. VMP Naphtha, an aliphatic hydrocarbon boiling from 112° to 139° C., is especially preferred. The weight ratio of organic liquid to copper phthalocyanine is preferably from 0.10 to 0.30, and more preferably from 0.17 to 0.24. It is preferable to use as small an amount of organic liquid as possible to facilitate recovery of the organic liquid via steam distillation, if desired. However, the amount of organic liquid should preferably be within the stated ranges to insure the conversion to beta phase of the mixture of alpha and beta phase copper phthalocyanine, which results from dry milling crude beta phase copper phthalocyanine. Amounts of organic liquid in excess of the stated ranges should be avoided, because excesses may cause the pigment to flocculate during grinding.

The weight ratio of water to copper phthalocyanine is preferably fromm 5 to 10 and more preferably from 6 to 8.33. In general a ratio of 6.66 is preferred to insure a fluid slurry which can be easily agitated and high quality tinctorial properties in the resulting copper phthalocyanine.

It is preferable in the practice of this invention to employ a surface active agent, or surfactant, in the preparatin of emulsion. Surfactants which may be used in the practice of the invention include anionic types, such as the sodium salt of dioctyl sulfosuccinic acid and sodium lauryl sulfate, cationic types, such as 1(2-hydroxyethyl)2-hydrogenated tallow-2-imidazoline and octyl trimethyl ammonium chloride in solution, and nonionic types, such as ethoxylated alcohols, ethoxylated nonyl phenol, polyoxy ethylene thio ether, and octyl phenoxy polyethoxy ethane.

In general, those surfactants that bring about effective emulsification of the appropriate organic liquid in water may be used. It is preferred that the weight ratio of surfactant to copper phthalocyanine be from 0.03 to 0.1. The addition of larger amounts is not harmful except when the amount becomes a major amount relative to the pigment, difficulties in filtration and alteration of the properties of the final product may be encountered.

Contact between the copper phthalocyanine and the emulsion may be carried out simply by vigorously stirring the slurry of emulsion and copper phthalocyanine, or contact can take place in a ball mill. The contact time between the organic liquid emulsion and the copper phthalocyanine should not be less than about one hour with a somewhat longer time, in the order of at least 2 hours, being definitely preferred. However, if the process of this invention is to be applied to chlorine-free copper phthalocyanine (this is a pigment in which the crystal phase is influenced by crystallizing solvent), there is often advantage in extending the contact time, particularly when it takes place in a ball mill, to as much as 16 hours and even up to about 36 hours, when a single crystal phase is desired. The upper limit on contact time is not particularly critical; however, it will, of course, be realized by those skilled in the art that excessively long periods in a ball mill may have some adverse effect on the pigment.

For the majority of applications, it is preferred to isolate the copper phthalocyanine pigment from the aqueous emulsion prior to use. However, in certain applications, such as inks, the aqueous emulsion containing the pigment may be used directly in ink systems without further processing.

When separation is desired, the preferred method of separating the emulsion from the copper phthalocyanine is by steam distillation, but other methods of separation may also be used. For example, the emulsion could be evaporated off by heating the copper phthalocyanine emulsion slurry in an open vessel, or the slurry could be filtered and the residual liquid removed by evaporation or steam distillation. In instances where the separation method does not employ heat, heating at temperatures up to the boiling point should be employed prior to the separation step.

The isolation of the copper phthalocyanine followng the removal of the organic liquid is conventional in every respect, and there are no critical features to this operation.

The following examples illustrate the invention.

EXAMPLE 1

Chlorinated Copper Pthalocyanine of the Alpha Phase

Crude chlorine-containing copper phthalocyanine containing about 4.5% of chlorine (obtained by reaction of 4-chlorophthalic acid, phthalic anhydride, urea, and copper chloride as described in Example II of U.S. Pat. No. 3,017,414 and containing about 1 atom of chlorine per molecule) is dry-milled for 15 hours in a conventional ball mill containing ⅝ × 1 inch steel rods and railroad spikes. After milling the dry powder is discharged from the mill through a suitable screen.

Twelve grams of the dry-milled copper phthalocyanine is added to an 8 oz. ball mill with 80 grams of water, 3.75 ml of VMP Naphtha, 0.8 gram of a commercially available surfactant sold by American Cyanimide under the trade name Aerosol OT/75 and 600 grams of ⅛ inch steel shot. The charge is milled for 72 hours at 13,000 revolutions per hour. After this the slurry is discharged from the mill and diluted with 150 grams of water. Four milliliters of 50% $H_2SO_4$ is added and the slurry heated to 95° C. for 1 hour, during which time most of the VMP Naphtha is effectively removed by steam distillation. The slurry is then filtered, washed acid-free, and dried to give a red shade blue copper phthalocyanine of the alpha phase.

When this pigment is tested by rubout on a Hoover muller in lithographic varnish (a well-known and conventional test for the tinctorial properties of colored pigments) it is found to be about 21% stronger with a darker and more transparent masstone than a commercially available chlorine-containing copper phthalocyanine of the alpha phase, used as a reference standard and tested in the same manner.

EXAMPLE 2

Chlorine-free Copper Phthalocyanine of the Beta Phase

Crude copper phthalocyanine (substantially free of chlorine and substantially all in the beta phase) is dry-milled for 18 hours in the conventional manner described in Example 1.

Twelve grams of the dry-milled copper phthalocyanine with the same ingredients described in Example 1 and in addition 0.5 gram of $Na_3PO_4$ and 0.5 gram of $Na_2CrO_4$ is ball milled as described in Example 1.

When this pigment is compared as described in Example 1 with a commercially available chlorine-free copper phthalocyanine pigment of the beta phase, it is found to be about 10% stronger and greener in hue with a darker and more transparent masstone.

Control A

The procedure of Example 2 is followed except that tetrachloroethylene is used instead of VMP Naphtha.

When this pigment is compared to the pigment of Example 2 it is found to be about 15% weaker, duller in hue with a much lighter and less transparent masstone.

Control B

The procedure of Example 2 is followed except that the crude copper phthalocyanine of the beta phase was used directly and not subjected to dry milling.

When this pigment is compared to the pigment of Example 2 it is found to be weaker and duller in hue with a much lighter and less transparent masstone.

What is claimed is:

1. In a process for converting crude copper phthalocyanine to pigmentary form which comprises dry milling said copper phthalocyanine in a milling apparatus having an attrition and shearing action, contacting the dry-milled copper phthalocyanine with an organic liquid in water emulsion, and recovering the pigmentary copper phthalocyanine,
    the improvement comprising utilizing as said organic liquid at least one aliphatic hydrocarbon derived from petroleum boiling from 50° to 180° C.

2. Process according to claim 1 wherein said aliphatic hydrocarbon boils from 96° to 146° C.

3. Process according to claim 2 wherein said aliphatic hydrocarbon is VMP Naphtha.

4. Process according to claim 1 wherein the weight ratio of water to copper phthalocyanine is from 5 to 10 and the weight ratio of organic liquid to copper phthalocyanine is from 0.10 to 0.30.

5. Process according to claim 4 wherein the weight ratio of water to copper phthalocyanine is from 6 to 8.33 and the weight ratio of organic liquid to copper phthalocyanine is from 0.17 to 0.24.

6. Process according to claim 5 wherein the organic liquid in water emulsion contains a surfactant.

7. Process according to claim 6 wherein the weight ratio of surfactant to copper phthalocyanine is from 0.03 to 0.10.

* * * * *